J. E. NEWBERRY.
PLOW HANDLE ADJUSTMENT.
APPLICATION FILED APR. 3, 1909.
940,609.
Patented Nov. 16, 1909.
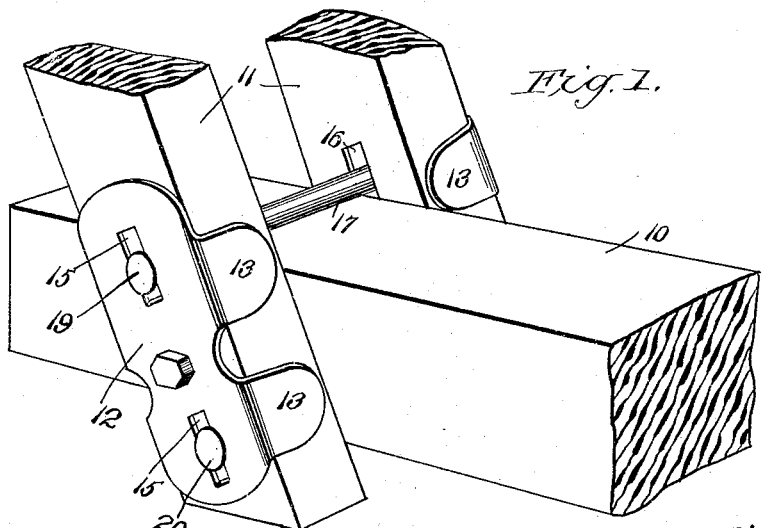
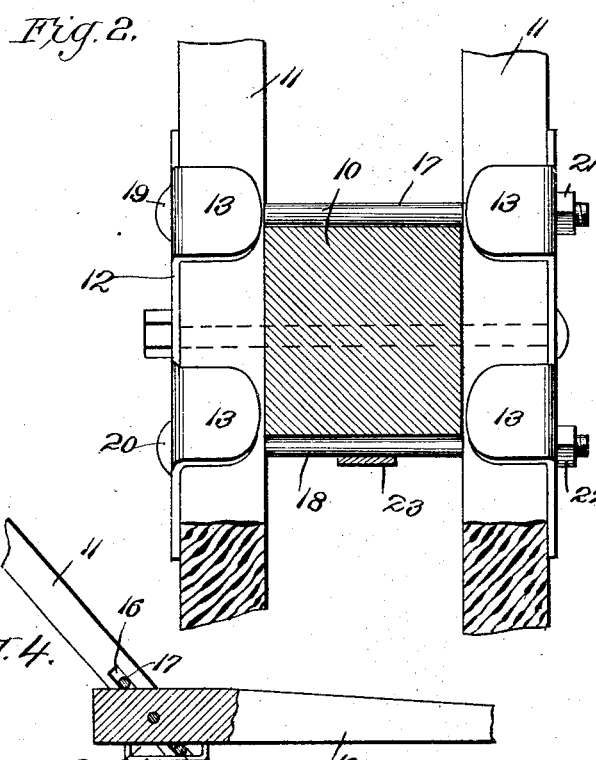
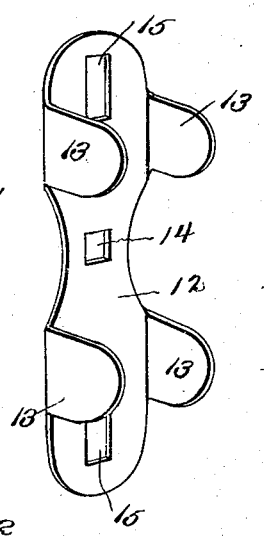
Witnesses
H. Strauss
Jos. A. Ryan
Inventor
James E. Newberry.
By Mason Fenwick & Lawrence,
Attorneys

UNITED STATES PATENT OFFICE.

JAMES E. NEWBERRY, OF DECATUR, GEORGIA.

PLOW-HANDLE ADJUSTMENT.

940,609.  Specification of Letters Patent.  Patented Nov. 16, 1909.

Application filed April 3, 1909. Serial No. 487,773.

*To all whom it may concern:*

Be it known that I, JAMES E. NEWBERRY, a citizen of the United States, residing at Decatur, in the county of Dekalb and State of Georgia, have invented certain new and useful Improvements in Plow-Handle Adjustments; and I do hereby declare the following to be a full, clear, and exact description of the invention, such as will enable others skilled in the art to which it appertains to make and use the same.

This invention relates to adjustments for plow handles and has for an object to provide means for clamping plow handles upon opposite sides of the plow beam in adjusted positions angularly relative thereto.

A further object of the invention is to provide members adapted to embrace the plow handles and through which the clamping bolts extend.

With these and other objects in view, the invention comprises certain novel constructions, combinations and arrangements of parts as will be hereinafter fully described and claimed.

In the drawings:—Figure 1 is a perspective view of a fragment of a plow beam with a fragment of the plow handles connected therewith. Fig. 2 is a transverse sectional view through a plow beam with the handles and clamping member shown in edge elevation. Fig. 3 is a perspective view of the clamping member. Fig. 4 is a diagrammatical view showing the means for supporting the lower clamping bolt.

Like characters of reference designate corresponding parts throughout the several views.

The present invention is intended to be applied to a plow having a beam 10 with handles 11 upon opposite sides thereof. Upon the outer sides of the plow handles a keeper shown as a whole at 12 is employed having lugs 13 spaced and positioned to fit with a reasonable degree of snugness upon the opposite edges of the plow handles as shown at Fig. 1. The keeper 12 is provided centrally with a hole or opening 14 through which is inserted a bolt 15 passing also through the handle 11 and beam 10 and forming a pivot upon which the handles may be adjusted angularly relative to the beam.

Adjacent the opposite ends of the keeper 12 slots 15′ are produced and registering slots 16 are produced through the handles 11.

Through the slots 16 bolts 17 and 18 are inserted having respectively heads 19 and 20 upon one side and nuts 21 and 22 upon the opposite side whereby when the nuts are tightened clamping tension is exerted upon the keeper 12.

It will be apparent that as the handles are moved relative to the beam 10 the bolts 17 and 18 which are supposed to bear respectively upon the top and bottom of the beam will vary in distance from each other. To support the lower bolt 18 a staple or supporting member 23 is employed preferably driven into the material of the under side of the beam and providing a slot 24 within which the bolt 18 may be moved.

In operation when it is desired to adjust the handle to a different angle the nuts 22 are loosened and the handles moved to the desired angle relative to the beam, the bolts 17 and 18 sliding in response to such movement in the slot 15 of the keepers and the slot 16 of the handle. When the desired angle has been secured the nuts 22 are tightened clamping the keepers firmly together with the handles upon the opposite side of the beam to prevent further angular movement.

In the present instance it will be apparent that as the handles are lowered to make them convenient of operation by a shorter person the leverage of such levers is increased so that the shorter person has a greater leverage for lifting the plow stock and structure than the taller person.

What I claim is:—

1. The combination with a plow beam, of handles pivoted upon opposite sides of the beam and provided with slots upon opposite sides of the pivot, bolts inserted through the slots and resting against the upper and under sides of the beam, and bearing members upon the exterior of the handles positioned to receive the strain of the bolts.

2. The combination with a plow beam, of plow handles pivoted upon opposite sides of the beam and having slots formed longitudinally of the handles upon opposite sides of the pivot, keeper members upon the exterior of the handles and provided with slots registering with the slots in the handles, and bolts extending through the registering slots and bearing upon the top and bottom of the beam.

3. The combination with a plow beam, of handles pivoted upon opposite sides of the beam, and having a slot formed through each of such handles below the pivot, a bolt inserted through the slots, and a member secured to the under side of the beam adapted to maintain the bolt substantially in engagement with the under surface of the beam.

4. As an article of manufacture, a keeper for plow handle adjustment comprising a plate having a central pivot opening with slots extending upon opposite sides of the pivot opening, and ears formed at the opposite edges and extending at right angles to the plane of the keeper.

5. As an article of manufacture, a keeper for plow handle adjustment comprising a substantially plane plate having a central pivot opening, and with alined slots formed upon opposite sides of the pivot opening, and ears formed upon opposite edges of the plate and turned at substantially right angles to the plane of such plate.

In testimony whereof I affix my signature in presence of two witnesses.

JAMES E. NEWBERRY.

Witnesses:
   JOHN L. FLETCHER,
   L. L. MORRILL.